United States Patent

Friedman et al.

[15] 3,660,782

[45] May 2, 1972

[54] SIGNAL LEVEL-TO-PULSE RATE CONVERTER

[72] Inventors: David Friedman; Kenneth Levy, both of Framingham, Mass.

[73] Assignee: Computervision Corporation, Burlington, Mass.

[22] Filed: Aug. 24, 1970

[21] Appl. No.: 66,344

[52] U.S. Cl. ..................................332/1, 307/271, 328/127, 332/9 R

[51] Int. Cl. ..........................................................H03k 7/10

[58] Field of Search .....................332/1, 9, 9 T, 10; 328/209, 328/127; 307/271; 325/41, 42, 143

[56] References Cited

UNITED STATES PATENTS

| | | | |
|---|---|---|---|
| 3,514,708 | 5/1970 | De Bretagne et al. | 332/9 R X |
| 3,390,354 | 6/1968 | Munch | 332/1 X |
| 3,510,640 | 5/1970 | Voelcker | 332/1 X |
| 3,541,320 | 11/1970 | Beall | 328/127 X |
| 3,566,283 | 2/1971 | Diebler | 328/127 X |

*Primary Examiner*—Alfred L. Brody
*Attorney*—Chittick, Pfund, Birch, Samuels & Gauthier

[57] ABSTRACT

An electronic circuit for generating pulses at a rate and of a nature representative of an input signal level. In order to limit the rate of change in the pulse rate to a rate of change at which an element driven by the pulses can respond, a filter is provided which establishes a maximum positive and negative slope for the signal waveform. The same slope is achieved for any abrupt step in the input signal level regardless of the magnitude of the step change. The slope-limited signal is then fed to a symmetrical zero-to-plus or minus infinite rate integrator which establishes a dead-band range surrounding the zero level. When the slope-limited signal level is outside the dead-band range, the integration proceeds at a rate proportional to the amount by which the signal level exceeds the dead-band until a positive or negative threshold level is reached, at which time a pulse is generated and the integrator reset to a lower magnitude. The pulse rate is thus proportional to the amount by which the input signal level exceeds the established dead-band.

14 Claims, 5 Drawing Figures

INVENTORS
DAVID FRIEDMAN
KENNETH LEVY
BY

Chittick, Pfund, Birch, Samuels & Gauthier
ATTORNEYS

INVENTORS
DAVID FRIEDMAN
KENNETH LEVY
BY
Chittick, Pfund, Birch, Samuels & Gauthier
ATTORNEYS

SIGNAL LEVEL-TO-PULSE RATE CONVERTER

RELATED APPLICATIONS

This application Ser. No. 66,343 is copending with the application of David Friedman and Kenneth Levy for NATURAL FEELING COMMON DRIVE PLOTTER-DIGITIZER filed Aug. 24, 1970 and assigned to the same assignee.

SUMMARY OF THE INVENTION

The conversion of signal level to pulse rate is a useful function in applications where precise control or monitoring of a digitally driven element such as a pulse motor is required. Each pulse generated by the converter can be used to produce a well defined unit of a desired effect in the driven element. A precise number of such units can be generated and that number stored or utilized in an electronic computation.

Since the desired effect is likely to be motion which has an inertia, it is important to limit the rate of change of the pulse rate to one which allows the driven element to respond to all of the pulses. It is, however, desirable to approach closely this maximum pulse rate change whenever the analog level is varying rapidly to insure the fastest possible system response and greatest efficiency. Also, any drift in the converter that generates pulses when there is no analog signal input can cause error in the driven element's response or require its constant realignment. The effect of this drift must be eliminated while at the same time giving the converter a wide dynamic range of pulses starting up from zero rate. Symmetry is desirable so as to produce equal pulse rates for equal signal level m magnitudes of opposite polarity, where the pulses are otherwise characterized to indicate signal level polarity.

It is accordingly a general object of the present invention to provide a relatively inexpensive signal level-to-pulse rate converter that is compatible with present day electronic systems.

It is a specific object of the invention to provide a signal level-to-pulse rate converter that produces pulses only when a non-zero signal level is clearly present at its input, but which is still capable of producing as slow a pulse rate as desired when this threshold is exceeded.

It is another object of the invention to provide a signal level-to-pulse rate converter in which the rate of change in pulse rate can be limited so as not to exceed a rate of change at which elements driven by the pulses can respond, but which closely approaches this limit for all rapid input signal level changes.

It is still another object of the invention to provide a simple and economical circuit design for a signal level-to-pulse rate converter using readily realizable transfer functions.

It is a further object of the invention to provide symmetry in the conversion of positive and negative signal levels in a signal level-to-pulse rate converter.

It is still a further object of the invention to make the parameters of these features readily variable.

In the preferred embodiment of the invention, an analog input signal level is converted to a digital pulse rate. Such a function is frequently required in present day electronics systems. The features of this invention make it particularly suitable for driving pulse excited machinery, such as, pulse motors having a slow response and for feeding further circuitry which records or processes the pulse information. Another feature of the invention is that it eliminates the converter drift that would normally lead to the generation of pulses in the absence of an input signal. The invention also provides a large continuous range of pulse rates starting at the zero rate and symmetrically converts either polarity of input signals.

These features are achieved by circuitry that first limits the slope of the input signal waveform. Pulses are then generated with characterization of the polarity of the input signal and at a rate representative of the amount by which the slope-limited signal's magnitude exceeds a predetermined dead-band.

The function of limiting the maximum positive and negative slope of the input signal waveform is accomplished with a low-pass filter driven by a high-gain amplifier which has a saturation output limit. A path of negative feedback is established from the filter's output to the amplifier's input. By placing the low-pass filter having a slow step response characteristic within the feedback loop, a maximum slope is obtained determined by the filter's response to a step equal to saturation output limit. For all abrupt changes in input signal level, whether large or small, the saturation limits are reached and consequently the maximum slope is achieved.

Pulse generation is achieved by an integrator which performs an integration with respect to time of the slope-limited signal input. When a positive or negative threshold level is reached by the integrator's output, a threshold detector generates a pulse characteristic of the particular threshold level reached. It also resets the integrator output to a level intermediate the two thresholds. A feedback loop around the integrator causes it to operate as an amplifier over a range of inputs comprising a dead-band range surrounding the zero level of the slope-limited signal. This dead-band ensures that neither the positive nor negative threshold level will be reached and no pulses will be generated for slope-limited input signals falling within the range of the dead-band. A definite zero-input stability is thereby imparted to the converter.

The feedback loop which causes the integrator to operate as an amplifier has a maximum limit on the magnitude of the signal which it can feed back to the integrator. This feedback signal limit defines the boundaries of the dead-band. Once the limit has been reached, any excess input from the slope-limited signal input is integrated at a rate proportional to that excess. Thus, whenever the slope-limited input signal level is outside the dead-band, the pulses are generated at a rate proportional to the amount by which it is outside the dead-band and not proportional to the slope-limited input signal itself. The integration rate itself depends mainly on passive circuit elements thereby making the integration symmetrical for slope-limited signals of either polarity.

The objects and features of the present invention will best be understood from a detailed description of a preferred embodiment thereof, selected for purposes of illustration and shown in the accompanying drawings, in which.

DETAILED DESCRIPTION OF THE PREFERRED EMBODIMENT

Figure 1:
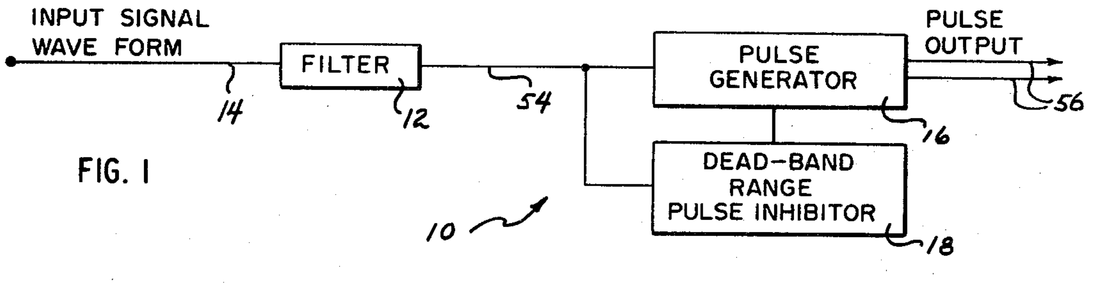
FIG. 1 is a block diagram of a signal level-to-pulse rate converter.

Turning now to the drawings, and particularly to FIG. 1 thereof, there is shown in block diagram form a signal level-to-pulse rate converter constructed in accordance with the present invention and indicated generally by the reference numeral 10. The converter 10 comprises three major elements: a filter 12 which limits the slope of the input waveform on line 14 to a maximum positive and negative value; a pulse generator 16; and, a dead-band range inhibitor 18.

Figure 2:
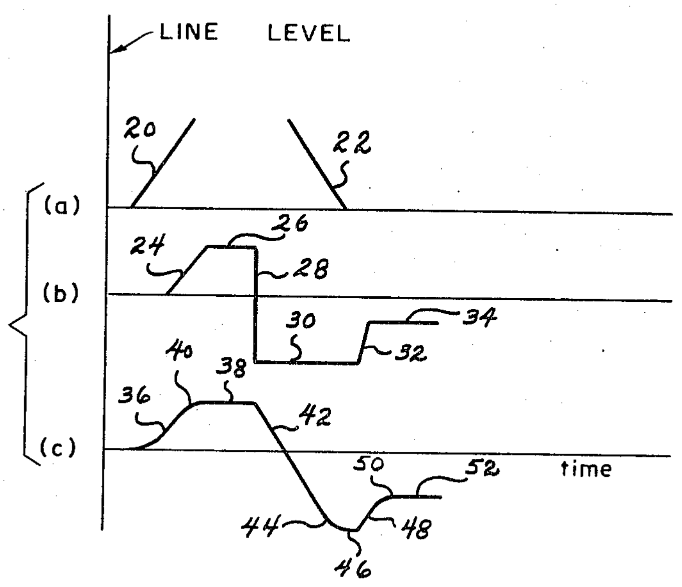
FIG. 2 is a waveform diagram showing the slope limits on the filter's response, a typical input signal waveform, and the filter's output for that typical signal input.

The operating characteristics of filter 12 are illustrated in FIG. 2. FIG. 2a shows representative maximum positive and negative slopes 20 and 22, respectively, as established by filter 12. FIG. **2*b* shows a typical input signal waveform sequence in which region 24 is steadily increasing signal level, 26 a constant level, 28 an abrupt negative step, 30 a constant level, 32 a smaller abrupt positive step, and 34 a constant level. FIG. 2c shows a representative output for filter 12** when excited with the input signal waveform illustrated in FIG. 2b. The slope of region 36 corresponds to the slope of steadily increasing input region 24 because that slope is less than the maximum slope 20. The slope 36 slowly diminishes in transition to the constant level 38 corresponding to constant input level 26. The reason for a decrease in slope at transition region 40 will be explained below.

The slope of filter output 42 closely approaches, but does not exceed, the maximum negative slope 22 because the abrupt transition 28 at the input is beyond the maximum negative slope 22. The filter 12 will consequently respond at the slope 42 nearly equal to slope 22. The transition region 44 where slope 42 gradually levels off to a value 46 representative of constant input level 30 is again due to the features of filter 12 explained below. Slope 48 nearly corresponds to the maximum positive slope limit 20 as the filter responds almost at the fastest rate possible to the small, but abrupt input step 32. It should be noted that although the step 32 is substantially smaller than step 28, the output of filter 12 responds with a slope 48 almost equal to slope 20 which is the maximum positive slope limit. Another transition region 50 occurs at the end of the filter's response to the step 32 as the filter reaches a constant level 52 representative of the constant input level 34.

Referring back now to FIG. 1, the output of filter 12 is carried by line 54 to the input of the symmetrical zero-to-infinite rate pulse generator 16 which produces pulses on output lines 56 that are representative of the input signal's level and polarity. The pulse generator 16 must be stabilized in order to prevent the generating of any pulses as a result of drift or error signals within the pulse generator in the absence of an input signal. The stabilization of the pulse generator is accomplished by establishing a dead-band range around the zero signal level on line 54. For all outputs from filter 12 that are within the range, the pulse generator 16 is inhibited from producing any pulse outputs. The dead-band range pulse inhibitor 18 performs this function by inhibiting the generation of pulses when the signal on line 54 out of filter 12 falls within the dead-band range of signal levels.

The pulse inhibitor 18 operates by opposing the signal level on line 54 with a feedback signal so that the pulse generator 18 effectively sees no input. The feedback signal is, however, limited in magnitude so that it ceases to completely cancel the signal level on line 54 at a predetermined point. Any signal level in excess of the predetermined point produces an effective input signal to the pulse generator 16 which in turn generates pulses at a rate proportional to the excess. Since the excess begins to increase from a zero value, the corresponding pulse rate begins from a zero rate and smoothly increases over a large dynamic range limited only by the pulse width.

Figure 3:
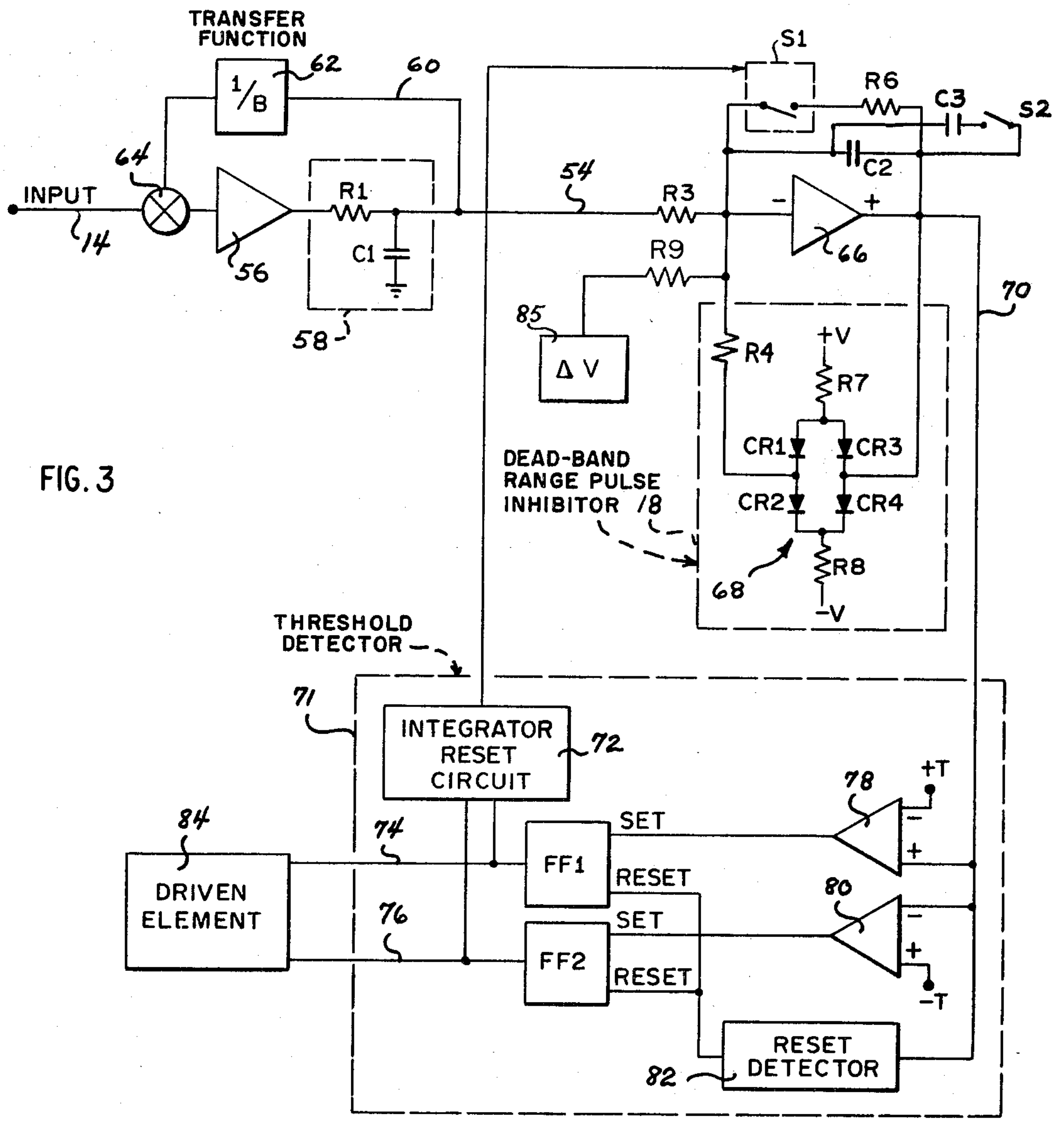
FIG. 3 is a partial schematic and block diagram of the circuit elements of the signal level-to-pulse rate converter shown in FIG. 1.
Figure 4:
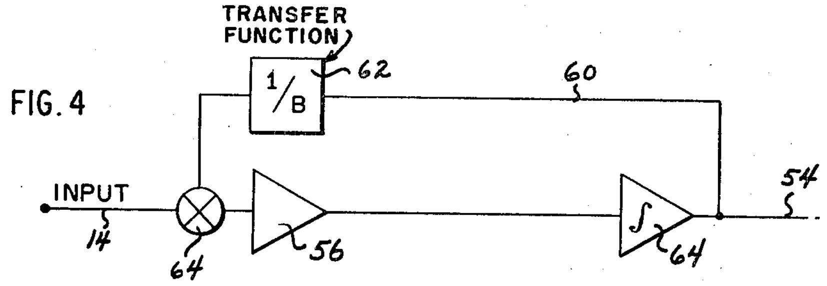
FIG. 4 is a block diagram of an alternative low-pass filter.

Looking now at the detailed block diagrams and partial schematics shown in FIGS. 3 and 4, the filter 12 comprises an amplifier 56, a low-pass filter 58, a feedback path 60 including a transfer function 62 and a signal combining means 64. In the example of FIG. 3, the low-pass filter 56 consists of resistance R1 connecting the output of amplifier 56 to one terminal of capacitor C1. The other terminal of capacitor C1 is connected to a ground or circuit common. Feedback path 60 is connected from the junction of resistor R1 and capacitor C1 through transfer function 1/B and combining means 64 to the input of amplifier 56. The transfer function element 1/B is typically a resistor plus a gain. Combining means 64 combines the input and feedback signals to insure that the feedback will be negative thereby diminishing the effective input signal to amplifier 56. While the low-pass filter 58 is shown in FIG. 2 as a simple RC filter, a low-pass filter of any other design, active or passive, can be substituted.

An alternative implementation for the low-pass filter 58 is shown in FIG. 4. Here, the low-pass filter 58 comprises an integrator 64 fed by the amplifier 56 with the feedback path 60 through transfer function 1/B taken from the output of the integrator 64. The output of the integrator 64 corresponds to the output of the slope-limiting filter 12 shown in FIG. 1.

The slope-limiting feature of the combination of the amplifier 56 and filter 58 depicted in FIG. 3 depends upon the fact that amplifier 56 has a high gain and plus and minus saturation limits on its output. The plus or minus saturation levels are at +S and −S. These outputs will exist whenever the input on line 14 is not almost entirely balanced in combiner 64 by the feedback. Because of the high gain of amplifier 56, a slight unbalance between the line 14 input and feedback generates a slight effective input and a large output. Amplifier 56 is thus easily saturated.

Normally, the feedback would respond instantly to the output of amplifier 56 to substantially cancel out the slight effective input to the amplifier thus limiting its gain. However, by placing a low-pass or slow response filter 58 in the output of amplifier 56 and taking the feedback from the output of the filter, the feedback is prevented from responding rapidly. This allows small changes on the line 14 input to pass through the combiner 64 to create an effective input to amplifier 56 which drives it into saturation before the feedback responds to balance the small change. Where a maximum slope-limit is imposed on the output of filter 58, the amplifier 56 saturation limits, +S and −S, will define the maximum voltage changes which have to be handled by the filter.

The the case of the R1–C1 filter 58 shown in FIG. 2, the time constant is adjusted so that the slope of the filter's output does not exceed the slope limit for an abrupt input step equal to 2S. That slope is $$\frac{\pm 2S}{(R1)(C1)}$$

For any step input on lime 14, the filter will respond at the rate of $$\frac{K}{(R1)(C1)}$$

where K is the difference between the filter's output before the step and the saturation level to which the amplifier is driven by the step input. Normally, K will be much greater than the actual voltage change finally effected at the filter's output because the open-loop gain of the amplifier is greater than the gain with the 1/B function feedback circuit. Thus, the slope for any step input is made to more nearly approach the slope limit.

Where the filter utilizes the integrator configuration of FIG. 4, the output slope will be equal to the input signal level taken from amplifier 56. Under these conditions, the maximum slope is ± S. Any step input sufficient to saturate amplifier 56 will generate an integrator 64 output having that slope. As the output of filter 58 responds, the feedback from the filter through the transfer function element 1/B reduces the effective input to the amplifier and eventually brings the amplifier out of saturation. At this point, the output of filter 58 slowly begins to level off to a value representing the input signal level on line 14. This leveling off accounts for the previously mentioned transition regions 40, 44 and 50 shown in FIG. 3c.

The output of filter 58 passes on line 54 into the negating input of an operational amplifier 66 through resistor R3. The positive output of amplifier 66 is fed back to the negating input through capacitor C2. The cooperation of resistor R3, capacitor C2 and amplifier 66 produces at the output of the amplifier an integration with respect to time of the signal output of filter 58.

A second feedback path between the output of amplifier 66 and its negating input is provided by feedback through diode bridge 68 and resistance R4. Together these elements comprise the dead-band range pulse inhibitor 18 illustrated in FIG. 1. The feedback path provides negative feedback for amplifier 66 when its input and output are within limits corresponding to the dead-band range. The diode bridge is composed of two rectifying elements or diodes each, CR1, CR2, CR3 and CR4. Both rectifying series are connected in parallel between two resistors, R7 and R8 which in turn are connected to positive and negative potentials +V and −V, respectively. All of the bridge diodes are oriented for conduction between these two potentials. The output of amplifier 66 is connected to the junction of diodes CR3 and CR4 which form one rectifying series while the negating input of amplifier 66 is connected through feedback impedance R4 to the junction between the diodes CR1 and CR2 within the other series.

For the zero input and output conditions of amplifier 66, all four diodes conduct current between the +V and −V potentials. R7 and R8 have large values of resistance compared to other impedances in the second feedback path and therefore operate with the +V and −V voltages essentially as constant current sources. As the output of amplifier 66 increases positively in response to an increasing negative signal level on line 54, CR3 conducts less and CR4 conducts more taking current from the amplifier 66 output. Since R7 conducts a nearly constant current, the decreased current through CR3 is compensated for by the increased current through CR1 to R4 and the input of amplifier 66. Nevertheless, resistor R7 conducts slightly less and resistor R8 conducts slightly more current to account for a voltage shift for the entire diode bridge 68 in the positive direction produced by the positive output of amplifier 66. This voltage shift supports the resulting current flow through feedback resistor R4 from CR1 into the negating input of amplifier 66 which is at virtual ground in the normal operational amplifier. In this manner, negative feedback is established for the operational amplifier 66.

As the output of amplifier 66 increases, CR3 will eventually become back-biased because the voltage at the junction between CR1 and R7 cannot rise above the level established by the maximum current flow as limited by R7 through CR1 and R4 to the virtual ground at the input to amplifier 66, assuming that R4 has a much smaller resistance than R7 and R8. CR2 will be back-biased due to the increasing voltage at the junction of R8 and CR4 caused by the increase in current through CR4. When both CR3 and CR2 become back-biased, the second feedback path is interrupted and the feedback current is essentially limited to the amount which R7 can conduct through CR1 and R4 to zero potential. At this point amplifier 66 begins to function as an integrator.

It can be seen from the symmetry of the feedback diode bridge 68, that the same process occurs for negative outputs from the amplifier 66. For small negative outputs, the feedback path is maintained, but for larger negative voltages diodes CR4 and CR1 become back-biased interrupting the feedback path by limiting its current to permit integration to proceed. By adjusting *V*, *R7*, *R8* and *R4*, the range of outputs from amplifier 66 which produce linear feedback can be controlled.

When operating as an integrator, the amplifier's rate of integration is determined by the amount by which the input signal level exceeds the feedback limit. When the input signal level is within the dead-band established by the diode bridge 68 and resistor *R4*, the feedback current through resistor *R4* into the input of amplifier 66 increases linearly with the increase in current through resistance *R3* as the voltage level on line 54 increases. The input voltage on line 54 (*V54*) and the output voltage on line 70 (*V70*) are related in the standard way for an operational amplifier:

$$V70/V54 = -R4/R3 \quad (1)$$

The voltage at the junction of the resistances *R3* and *R4* forming the input to amplifier 66 is kept near zero by the balanced currents through the resistances so that little current enters the amplifier. If the currents through *R3* and *R4* are *I3* and *I4*, respectively, then:

$$I3=\frac{V54}{R3};\ I4=\frac{V70}{R4} \quad (2)$$

and since $$\frac{V54}{R3}=-\frac{V70}{R4} \quad (3)$$

from (1), then $$I3=-I4 \quad (4)$$

The current which can flow through *R4* from the diode bridge is limited, however, as described above; the limiting value being approximately:

$$I4_{max}\simeq\frac{V}{R4+R7}\ \text{where}\ R7=R8 \quad (5)$$

Once the $I4_{max}$ has been reached, no further current can be supplied by *R4* to match the current through *R3*. Instead, all of the current must be supplied by the capacitive feedback path through C2. If *Ic* is the capacitor C2 current, then it is necessary that $Ic = -I3-I4_{max}$ for the virtual ground at the input to amplifier 66 to be maintained. *Ic* and *Vcc*, the voltage across capacitor C2 and essentially the same as the output of amplifier 66, are related by the integral:

$$Vc=\int_0^t Ic\,d\tau\ \text{where } t \text{ is time} \quad (6)$$

For a constant *Tc* above $I4_{max}$, *Ic* is constant. In this case *Vc* is a ramp. At the point where $I4_{max}=-I3$, the ramp has a zero slope since *Ic* is zero. Beyond this point the value of Ic increases above zero and the ramp, *Vc*, increases slowly at a rate proportional to the difference between *−I3* and *I4*. Very slow or zero rates are thus obtainable while the range of slope for Vc is essentially limitless, depending only on the signal level on line 54 and the current,*I3*, it produces in *R3*. This feature provides an enormous range in pulse rates running from zero to nearly infinity.

The slope of *Vc* can be positive or negative depending upon the polarity of the output signal from filter 58. This makes the integration operation symmetrical about zero without any switching to different elements to control the integration rate. The integration rate depends only on C2, *R3* and *Ic*. C2 and *R3* are the same for either polarity while *Ic* will only vary with the slight variations in components in the diode bridge 68.

The output of amplifier 66 is conducted on line 70 to threshold detector 71 which produces a pulse whenever the output of amplifier 66 reaches a positive or negative threshold level. The pulse rate of the pulses generated by the threshold detector 71 is a direct function of the integration rate. The pulses from the threshold detector are used to energize switch S1 through an integrator reset circuit 72. Switch S1 is connected in series with resistor R6 which is in parallel with the integrating capacitor C2. Energization of switch S1 discharged C2 and resets the output of amplifier 66 to a value near zero and intermediate the positive and negative threshold limits. In the circuitry of FIG. 3, polarity characterization of the pulse is accomplished by providing two pulse output connections on lines 74 and 76. Pulses from detection of a positive threshold appear on line 74 while those from detection of a negative threshold appear on line 76.

The threshold detector 71 includes two comparators, 78 and 80, which are differential amplifiers operating in a conventional manner. The outputs from the differential amplifiers change from one saturation level to the other very rapidly as their negating and non-negating inputs change phase. A +T reference level is fed to the negating input of comparator 78 and a −T reference to the non-negating input of comparator 80. The other inputs are fed by amplifier 66. The comparators thus function as threshold detectors changing outputs when +T or −T thresholds are reached by the output of amplifier 66. The outputs of comparators 78 and 80 are connected to the SET inputs of by-stable flip-flops FF1 and FF2. The outputs of these flip-flops feed the integrator reset circuit 72 which in turn feeds switch S1 connected in series with resistance *R6* across capacitor C2. In operation, comparator 78 changes its output when the output from amplifier 66 passes through the positive threshold level +T and comparator 80 does the same for negative outputs of the amplifier 66 passing through negative threshold level −T. The change in the output of comparator 78 corresponding to the output of amplifier 66 reaching the +T level produces a SET input to flip-flop FF1. Similarly, −T threshold level output from amplifier 66 produces a SET input on flip-flop FF2. Either a +T or −T occurrence at the output of amplifier 66 changes the output of one of the flip-flops which causes a corresponding change in the output of integrator reset circuit 72. Switch S1 is closed in response to the change in the output of reset circuit 72. Capacitor C2 then discharges through resistor *R*6 reducing the output of amplifier 66 to near zero.

When this near zero output of amplifier 66 is detected by a reset detector 82 which is connected to the output of amplifier 66, a reset signal is produced on the RESET inputs of flip-flops FF1 and FF2 fed by the reset detector's output. Whichever flip-flop was originally set by comparators 78 and 80 on the occurrence of the positive or negative threshold level at the output of amplifier 66 is reset when the integrating capacitor C2 has been discharged. The other flip-flop was not affected by that output of amplifier 66 and the reset signal has no effect upon it. A pulse of well defined amplitude and duration is thus produced by flip-flop FF1 when the output of the amplifier 66 reaches the positive threshold and similarly by flip-flop FF2 for the negative threshold.

Since a pulse is generated every time the integration reaches a threshold, the rate of integration defines the pulse rate. The wide range in rates of integration possible from zero to nearly infinity allows a correspondingly wide range in pulse rates from zero to nearly infinity.

Effectively, the pulse generator can respond to any input signal level with a correspondingly high pulse rate. There are no limits on its range except pulse width requiring a minimum spacing between pulses. Pulse width can be adjusted through the C2, *R*6 time constant and other parameters of the circuitry.

The output pulses from the flip-flop are fed to a driven element 84 which can be any device that utilizes input pulses whose rate and character are representative of the level and polarity of a signal waveform. As one specific example, these pulses can be used to energize pulse motors and their control circuitry. The driven element 84 can also include computers or counters to process or store the information represented by the pulses produced by this converter. This particular use is described in our above-mentioned co-pending application.

One optional addition to the signal level-to-pulse rate converter described above is means for changing the sensitivity of the converter so that a given input signal level in excess of the dead-band produces a different pulse rate. The sensitivity can be changed by altering the overall gain of filter 12 shown in FIG. 1. However, preferably, the sensitivity is adjusted by changing the value of the integration capacitor for amplifier 66 such as by switching another capacitor C3 in parallel with capacitor C2 with switch S2 shown in FIG. 3. In this way, the sensitivity is altered without any change in the dead-band.

Another optional addition to the signal level-to-pulse rate converter is a means for introducing an offset without changing the properties of the dead-band. This can be easily accomplished in the present invention because the dead-band is produced in the pulse rate converter itself, unlike other systems where the dead-band is produced in the processing amplifier. Looking at FIG. 3, a voltage offset 85 $\Delta V$ is simply applied to the input of amplifier 66 through offset resistor R9 to change the position of the dead-band.

Figure 5:
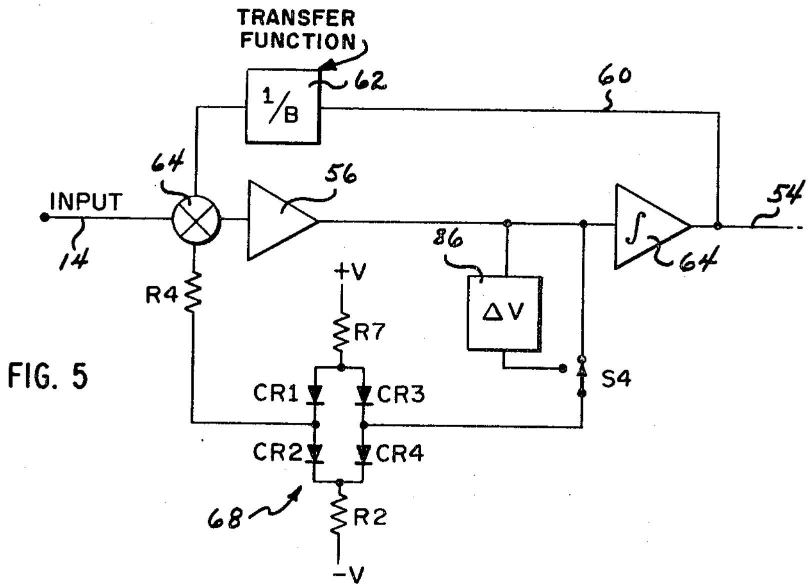
FIG. 5 is a partial schematic and block diagram illustrating an alternative use of the feedback limiter.

An alteration of the FIG. 4 filter is shown in FIG. 5 in which the amplifier 56 of FIG. 4 has the same diode bridge feedback path as amplifier 66 shown in FIG. 3. The limited feedback around amplifier 56 gives it a dead-band center-off condition keeping the output of the amplifier near zero until a predetermined amount of effective input is received by the amplifier. Because high gain amplifiers in the open-loop condition tend to slip from one saturation level to the other without a stable intermediate out-put, a zero output is unobtainable. The inclusion of the limited feedback path around amplifier 56 creates a stable zero condition.

A switch S4 can be provided between the output of amplifier 56 and the diode bridge 68 to switch a voltage offset 86 of $\Delta V$ into the feedback path. The effect of the offset 86 is to change the position of the dead-band by the amount of $\Delta V$ so that it can create a stable output level on amplifier 56 output at any point between the saturation limits.

Having described in detail the preferred embodiments of our invention, what we desire to claim and secure by Letters Patent of the United States is:

1. A signal level-to-pulse rate converter for converting the level of a signal to a pulse rate comprising:

a. stabilized pulse generating means for generating pulses at a rate and with a characteristic representative of the level and polarity of said signal; and, b. control means coupled to said pulse generating means for establishing a dead-band range of levels for said signal level within which the generating means produces no pulses, said control means permitting a pulse rate which commences at zero and which increases with corresponding increases in said signal's level beyond the dead-band range.

2. The converter of claim 1 further characterized by said pulse generating means having a range of pulse rates from zero to plus or minus nearly infinity.

3. The converter of claim 1 further characterized by said pulse generating means generating pulses at rate which is independent of the polarity of said signal.

4. The converter of claim 1 further comprising means for varying the size of said dead-band range.

5. The converter of claim 1 further comprising means for offsetting the position of said dead-band range.

6. The converter of claim 1 wherein said stablilized pulse generating means further comprises:

a. integrating means for producing at an output an integration with respect to time of the amount by which the signal level exceeds the dead-band range when the signal level is outside the dead-band range, and producing at the output of said integrating means an amplification of the signal level when the signal level is within the dead-band range; and, b. threshold detecting means coupled to said integrating means for generating a pulse when the integration at the output of said integrating means reaches a positive or negative threshold level, said detecting means adapted for generating the pulse in a manner indicating the particular threshold level reached, and for resetting the level of the output of said integrating means to a level intermediate to the threshold levels.

7. The converter of claim 6 wherein said integrating means further comprises:

a. first amplifying means for amplifying said signal;

b. capacitive electrical impedance means for forming a first negative feedback path around said first amplifying means;

c. a resistive electrical impedance connected to the input of said first amplifying means; and, d. a second negative feedback path around said first amplifying means, said second negative feedback path having means for limiting its feedback to nearly a constant value when the signal level is outside the dead-band range.

8. The converter of claim 6 further characterized by means for offsetting the position of said dead-band range.

9. The converter of claim 7 further comprising means for varying the limits of the feedback in said second negative feedback path.

10. The converter of claim 7 further characterized by said second negative feedback path further comprising means for offsetting the position of said dead-band range.

11. The converter of claim 7 wherein said means limiting the feedback of said second negative feedback path further comprises:

a. a first rectifying series comprising two rectifying elements connected in series to conduct electricity from a positive potential through a resistance between the positive potential and said first rectifying series to a negative potential through a resistance between said first rectifying series and the negative potentials; and, b. a second rectifying series comprising two rectifying elements connected in series,said second rectifying series placed in parallel with said first rectifying series with said first negative feedback path proceeding from the junction of the rectifying elements of said first rectifying series to the output of said first amplifying means and from the junction of the rectifying elements of said second rectifying series to the input of said first amplifying means.

12. A signal level-to-pulse rate converter comprising:

a. slope limiting means for imparting a maximum positive and negative slope limit to the signal waveform; and, b. stabilized pulse generating means coupled to said slope limiting means for generating pulses at a rate and with a characteristic representative of the level and polarity of said slope limited signal, said pulse generating means including means for establishing a dead-band range of levels for the slope limited signal within which the generating means produces no pulses, said dead-band establishing means permitting a pulse rate which commences at zero and which increases with corresponding increases in the slope limited signal level beyond the dead-band range.

13. The converter of claim 12 wherein said slope limiting means comprises:

a. amplifying means for amplifying the signal level;

b. low-pass filtering means for low-pass filtering of an output of said signal level amplifying means, said low-pass filtering means having a slope rate which is controlled by the saturation rate of said amplifying means; and, c. a path of negative feedback connected from the output of said low-pass filtering means to an input of said signal level amplifying means.

14. The converter of claim 12 wherein said slope limiting means comprises:

a. amplifying means for amplifying the signal level;

b. integrating means for integrating the output of said amplifying means; and, c. a path of negative feedback connected from the output of said integrating means to an input of said amplifying means.

* * * * *

UNITED STATES PATENT OFFICE
CERTIFICATE OF CORRECTION

Patent No. 3,660,782 Dated May 2, 1970

Inventor(s) David Friedman, Kenneth Levy

It is certified that error appears in the above-identified patent and that said Letters Patent are hereby corrected as shown below:

Column 4, line 25, "The the" should be -- The--;

Column 4, line 31, "lime" should be -- "line--;

Column 6, line 12, "$I_C$ and $V_{CC}$" should be -- $I_C$ and $V_C$--

Column 6, line 19, "$T_c$ above $I4_{max}$" should be-- $I_c$ above $14_{max}$--

Signed and sealed this 26th day of December 1972.

(SEAL)
Attest:

EDWARD M.FLETCHER,JR.
Attesting Officer

ROBERT GOTTSCHALK
Commissioner of Patents